(12) United States Patent  
Li (10) Patent No.: US 12,186,653 B2  
(45) Date of Patent: Jan. 7, 2025

(54) VIDEOGAME WITH AUTOMATIC AND MANUAL ATTACK TARGET SELECTION

(71) Applicant: NETEASE (HANGZHOU) NETWORK CO., LTD., Zhejiang (CN)

(72) Inventor: Jingcheng Li, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 531 days.

(21) Appl. No.: 17/436,376

(22) PCT Filed: Dec. 13, 2019

(86) PCT No.: PCT/CN2019/125202  
§ 371 (c)(1),  
(2) Date: Sep. 3, 2021

(87) PCT Pub. No.: WO2020/177435  
PCT Pub. Date: Sep. 10, 2020

(65) Prior Publication Data  
US 2022/0152478 A1  May 19, 2022

(30) Foreign Application Priority Data  
Mar. 5, 2019 (CN) .......................... 201910164444.1

(51) Int. Cl.  
*A63F 13/822* (2014.01)  
*A63F 13/2145* (2014.01)  
(Continued)

(52) U.S. Cl.  
CPC ........ *A63F 13/2145* (2014.09); *A63F 13/533* (2014.09); *A63F 13/58* (2014.09); *A63F 13/822* (2014.09); *A63F 13/92* (2014.09)

(58) Field of Classification Search  
CPC .......................... A63F 13/2145; A63F 13/822  
See application file for complete search history.

(56) References Cited

U.S. PATENT DOCUMENTS

| 2014/0149903 A1* | 5/2014 | Ahn ...................... G06F 3/0484 |
| | | 715/765 |
| 2015/0157940 A1* | 6/2015 | Hall .................... A63F 13/5372 |
| | | 463/31 |

(Continued)

FOREIGN PATENT DOCUMENTS

| CN | 105094345 A | 11/2015 |
| CN | 105739856 A | 7/2016 |

(Continued)

OTHER PUBLICATIONS

The International Search Report dated Mar. 19, 2020 for PCT international application No. PCT/CN2019/125202.

(Continued)

*Primary Examiner* — Corbett B Coburn  
(74) *Attorney, Agent, or Firm* — Qinghong Xu (57) ABSTRACT

The present disclosure relates to the field of game technologies, and in particular, to an information processing method, apparatus, medium, and electronic device in a mobile terminal. The method includes: in response to a first touch operation acting on a first attack control, controlling a first game character to perform a first attack operation corresponding to the first attack control according to a preset automatic target selection rule; and in response to a second touch operation acting on the first attack control, displaying a target selection control containing at least one game character identification, determining a target game character identification from the at least one game character identification according to a third touch operation acting on the target selection control, and controlling the first game char- (Continued)

acter to perform the first attack operation against a target game character corresponding to the target game character identification.

17 Claims, 4 Drawing Sheets

(51) Int. Cl.
    *A63F 13/533*     (2014.01)
    *A63F 13/58*     (2014.01)
    *A63F 13/92*     (2014.01)

(56) References Cited

U.S. PATENT DOCUMENTS

| | | | |
|---|---|---|---|
| 2016/0074754 A1 | 3/2016 | Kuninobu | |
| 2016/0175714 A1* | 6/2016 | Ishii | G06F 3/0488 463/31 |
| 2017/0340959 A1* | 11/2017 | Tang | A63F 13/426 |
| 2018/0104591 A1 | 4/2018 | Fukuda | |
| 2018/0304158 A1* | 10/2018 | Miyamae | A63F 13/533 |
| 2018/0369693 A1* | 12/2018 | Rong | A63F 13/92 |

FOREIGN PATENT DOCUMENTS

| | | |
|---|---|---|
| CN | 106512406 A | 3/2017 |
| CN | 106621331 B | 12/2017 |
| CN | 107450812 A | 12/2017 |
| CN | 107643842 A | 1/2018 |
| CN | 107930122 A | 4/2018 |
| CN | 108310772 A | 7/2018 |
| CN | 109224439 A | 1/2019 |
| CN | 109865282 A | 6/2019 |
| JP | 2018057742 A | 4/2018 |
| WO | WO-2014199693 A1 * 12/2014 | ........... A63F 13/422 |

OTHER PUBLICATIONS

The 1st Office Action dated Oct. 21, 2019 for CN patent application No. 201910164444.1.

* cited by examiner

VIDEOGAME WITH AUTOMATIC AND MANUAL ATTACK TARGET SELECTION

The present application is based upon International Application No. PCT/CN2019/125202, filed on Dec. 13, 2019, which is based upon and claims the priority to the Chinese Patent Application No. 201910164444.1, filed on Mar. 5, 2019, the entire contents of which are hereby incorporated by reference.

TECHNICAL FIELD

The present disclosure relates to the field of game technologies, and in particular, to an information processing method in a mobile terminal, an information processing apparatus in the mobile terminal, and a computer-readable medium and electronic device that implement the information processing method in the mobile terminal.

BACKGROUND

With development of mobile communication technologies, more and more mobile terminal games have emerged. In many games, game players need to select target operation objects (for example, target attack objects). Due to limitations of hardware conditions and interaction manners, most of control manners in traditional PC games cannot be transplanted to the mobile terminal games, which also makes the mobile terminal games significantly different from the traditional PC games in terms of the control manners for selecting target operation objects.

Game experience brought to the players by the mobile terminal games needs to be improved.

It should be noted that the information disclosed in the Background section above is only for enhancing the understanding of the background of the present disclosure, and thus may include information that does not constitute prior art known to those of ordinary skill in the art.

SUMMARY

An objective of embodiments of the present disclosure is to provide an information processing method in a mobile terminal, an information processing apparatus in the mobile terminal, and a computer-readable medium and electronic device that implement the above information processing method in the mobile terminal.

According to a first aspect of the embodiments of the present disclosure, there is provided an information processing method in a mobile terminal, a software application of a preset game is run in the mobile terminal and a graphical user interface is rendered on a display of the mobile terminal, the graphical user interface contains a first game character and a first attack control, the above method includes:

in response to a first touch operation acting on the first attack control, controlling the first game character to perform a first attack operation corresponding to the first attack control according to a preset automatic target selection rule;

in response to a second touch operation acting on the first attack control, displaying a target selection control containing at least one game character identification, determining a target game character identification from the at least one game character identification according to a third touch operation acting on the target selection control; and in response to the third touch operation acting on the target selection control, controlling the first game character to perform the first attack operation against a target game character corresponding to the target game character identification.

In some embodiments of the present disclosure, based on the foregoing embodiments, the at least one game character identification in the target selection control is a game character identification corresponding to a second game character that satisfies a preset condition.

In some embodiments of the present disclosure, based on the foregoing embodiments, the second game character that satisfies the preset condition includes: a second game character determined according to a position of the first game character.

In some embodiments of the present disclosure, based on the foregoing embodiments, the second game character that satisfies the preset condition includes: a second game character determined according to an attribute of the first attack operation.

In some embodiments of the present disclosure, based on the foregoing embodiments, the first touch operation is a touch tapping operation, the second touch operation is a touch sliding operation, and the third touch operation is a touch sliding operation that is continuous with the second touch operation, In some embodiments of the present disclosure, based on the foregoing embodiments, the determining a target game character identification from the at least one game character identification according to a third touch operation acting on the target selection control includes:

determining the target game character identification from the at least one game character identification at least according to a position of a touch point of the third touch operation acting on the target selection control.

In some embodiments of the present disclosure, based on the foregoing embodiments, the method further includes:

if the target game character satisfies a preset locking condition, controlling the first game character to perform the first attack operation against the target game character in response to a fourth touch operation acting on the first attack control, wherein the fourth touch operation is chronologically later than the third touch operation.

In some embodiments of the present disclosure, based on the foregoing embodiments, the game character identifications in the target selection control are arranged in a circular form.

In some embodiments of the present disclosure, based on the foregoing embodiments, a position of a corresponding game character identification in the target selection control is determined according to an attribute of the second game character.

In some embodiments of the present disclosure, based on the foregoing embodiments, a size of an operation response area of the corresponding game character identification in the target selection control is determined according to the attribute of the second game character.

In some embodiments of the present disclosure, based on the foregoing embodiments, a display position of the target selection control is determined according to a position of the first attack control.

In some embodiments of the present disclosure, based on the foregoing embodiments, the display position of the target selection control is determined according to a position of a touch point of the second touch operation.

In some embodiments of the present disclosure, based on the foregoing embodiments, a second attack control is contained in the graphical user interface, and the method further includes the following step.

If the target game character satisfies the preset locking condition, in response to a fifth touch operation acting on the second attack control, controlling the first game character to perform a second attack operation corresponding to the second attack control against the target game character, wherein the fifth touch operation is chronologically later than the third touch operation.

In some embodiments of the present disclosure, based on the foregoing embodiments, the preset locking condition includes: a vitality index corresponding to the target game character is greater than zero and no switching touch operation is detected.

In some embodiments of the present disclosure, based on the foregoing embodiments, the method further includes: in response to the third touch operation being finished, canceling a display of the target selection control.

In some embodiments of the present disclosure, based on the foregoing embodiments, the method further includes:

displaying a selected identification at the attack target, and/or, after determining the target game character identification, pushing a reminder of selecting the attack target to remind a player of having successfully selected the attack target.

According to a second aspect of the embodiments of the present disclosure, there is provided an information processing apparatus in a mobile terminal, a software application of a preset game is run in the mobile terminal and a graphical user interface is rendered on a display of the mobile terminal, the graphical user interface contains a first game character and a first attack control. The apparatus includes:

a first response module, configured to control the first game character to perform a first attack operation corresponding to the first attack control according to a preset automatic target selection rule in response to a first touch operation acting on the first attack control;

a second response module, configured to, in response to a second touch operation acting on the first attack control, display a target selection control containing at least one game character identification, determine a target game character identification from the at least one game character identification according to a third touch operation acting on the target selection control, and in response to the third touch operation acting on the target selection control, control the first game character to perform the first attack operation against a target game character corresponding to the target game character identification.

According to a third aspect of the embodiments of the present disclosure, there is provided a computer-readable medium on which a computer program is stored, and the program, when executed, implements the information processing method in the mobile terminal as described in the first aspect of the above embodiments.

According to a fourth aspect of the embodiments of the present disclosure, there is provided an electronic device including: one or more processors; and a storage apparatus for storing one or more programs, wherein the one or more programs, when executed by the one or more processors, cause the one or more processors to implement the information processing method in the mobile terminal as described in the first aspect of the above embodiments.

It should be noted that the above general description and the following detailed description are merely exemplary and explanatory and should not be construed as limiting of the disclosure.

BRIEF DESCRIPTION OF THE DRAWINGS

The above and other features and advantages of the present disclosure will become more apparent by describing in detail exemplary embodiments thereof with reference to the drawings. Obviously, the drawings in the following description are only some embodiments of the present disclosure. For those of ordinary skill in the art, other drawings can be obtained based on these drawings without departing from the spirit of the present disclosure.

DETAILED DESCRIPTION

Example embodiments will now he described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, apparatuses, steps, and the like may he employed. In other instances, well-known methods, apparatuses, implementations or operations are not shown or described in detail to avoid obscuring various aspects of the present disclosure.

The block diagrams shown in the figures are merely functional entities and do not necessarily correspond to physically separate entities. These functional entities may be implemented in software, or implemented in one or more hardware modules or integrated circuits, or implemented in different networks and/or processor apparatuses and/or microcontroller apparatuses.

The flow charts shown in the drawings are only exemplary illustrations, and it is not necessary to include all contents and operations/steps, nor to be executed in the order described. For example, some operations/steps can also be decomposed, and some operations/steps can be merged or partially merged, so the order of actual execution may change according to the actual situation, At present, there are two common ways to select a target operation object in mobile terminal games:

1. Target objects in a game are divided into two categories, for example, a first category is NPC (Non-Player Character)/Minions, and a second category is characters/ heroes controlled by other game players. The game player taps an attack control and slides upward to automatically select and attack one target object in the first category of target objects, and taps the attack control and slides downward to automatically select and attack one target object in the second category of target objects.

2. Multiple attack controls are displayed in an arrangement area for the attack control at a lower right corner of a screen, when an attackable object appears within a certain range of a character controlled by the player, a small avatar of the object is displayed near the arrangement area for the attack control, the player taps the corresponding avatar, and the character will select and attack the corresponding target.

Figure 1:
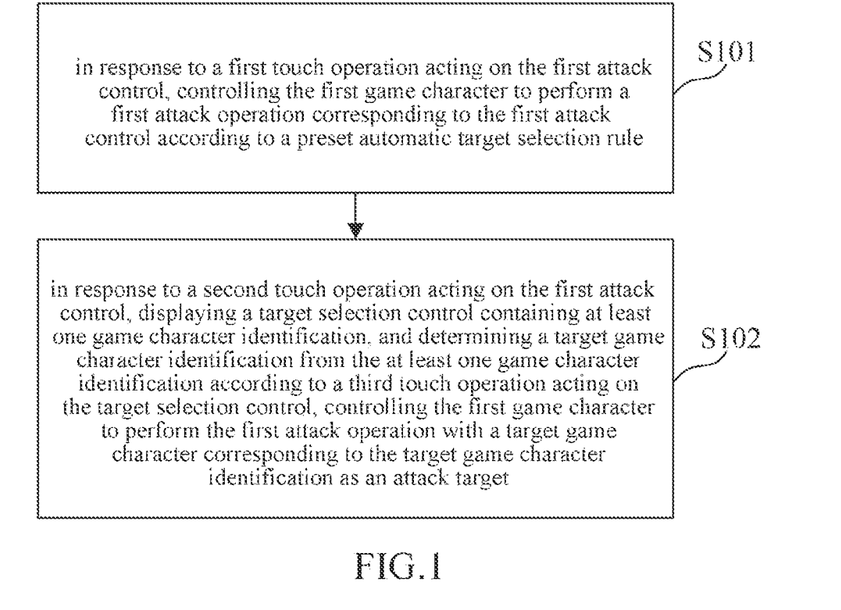
FIG. 1 shows a schematic flowchart of an information processing method in a mobile terminal according to an embodiment of the present disclosure.

However, in games based on mobile terminals in the related art, during selection of the attack target, related controls will occupy a limited game interface of the mobile terminal and cause occlusion of real-time scenes in the game, thereby causing some interference to the player, affecting the player's observation of a battlefield to a certain extent and distracting the player from paying attention to operations of fingers. FIG. 1 shows a schematic flowchart of an information processing method in a mobile terminal according to an embodiment of the present disclosure. The information processing method in the mobile terminal provided by the embodiment overcomes the above disadvantages of the information processing method in the mobile terminal in the related art at least to a certain extent. An execution body of the information processing method in the mobile terminal provided in the embodiment may be a device with a calculation processing function, such as the mobile terminal, a server or the like. In addition, a software application of a preset game is run in the above mobile terminal and a graphical user interface is rendered on a display of the above mobile terminal, and the graphical user interface contains a first game character and a first attack control.

Referring to FIG. 1, the information processing method in the mobile terminal provided by the embodiment includes step S101 and step S102.

In the step S101, in response to a first touch operation acting on the first attack control, the first game character is controlled to perform a first attack operation corresponding to the first attack control according to a preset automatic target selection rule.

In an exemplary embodiment, the first attack control may he an attack button in the graphical user interface of a game. The first game character may be a game character (i.e., "a current player") corresponding to an account currently logged on the mobile terminal. The first attack operation may be an attack performed by the current player on the "enemy game character" by the attack button.

In an exemplary embodiment, during an attack game, a user's finger of the mobile terminal generally stays at the "general attack button" for a long time period, to prepare to attack the enemy at any time or to be attacking the enemy. Therefore, using the general attack button (a virtual button used for triggering the attack, also referred as to the attack button, or the like) in the game as a preset area that can trigger a target selection mechanism will greatly save a movement distance of the user's finger, which is conducive to the player to quickly and accurately select the attack target. In addition, it also facilitates disappearance of the target selection control as soon as possible, thereby shortening the time for blocking the game scene, and thus facilitating to improve the user's game experience.

In the step S102, in response to a second touch operation acting on the first attack control, a target selection control containing at least one game character identification is displayed, and a target game character identification is determined from the at least one game character identification according to a third touch operation acting on the target selection control, and in response to the third touch operation acting on the target selection control, the first game character is controlled to perform the first attack operation against a target game character corresponding to the target game character identification.

In an exemplary embodiment, the second touch operation is different from the first touch operation. In this way, by performing different touch operations on the same attack control, the attack target corresponding to the first attack operation is determined in a different way, so that the game player can actively adjust an attack target selection method in time according to needs in a game battle process. The target object can be determined by the first touch operation acting on the first attack control according to the preset automatic target selection rule, and the target object can also be selected quickly, consistently and accurately by the second touch operation acting on the first attack control according to the players automatic will. Providing the game player with different attack manners makes the game operation more flexible, thereby facilitating to improve the player's game experience.

Figure 2:
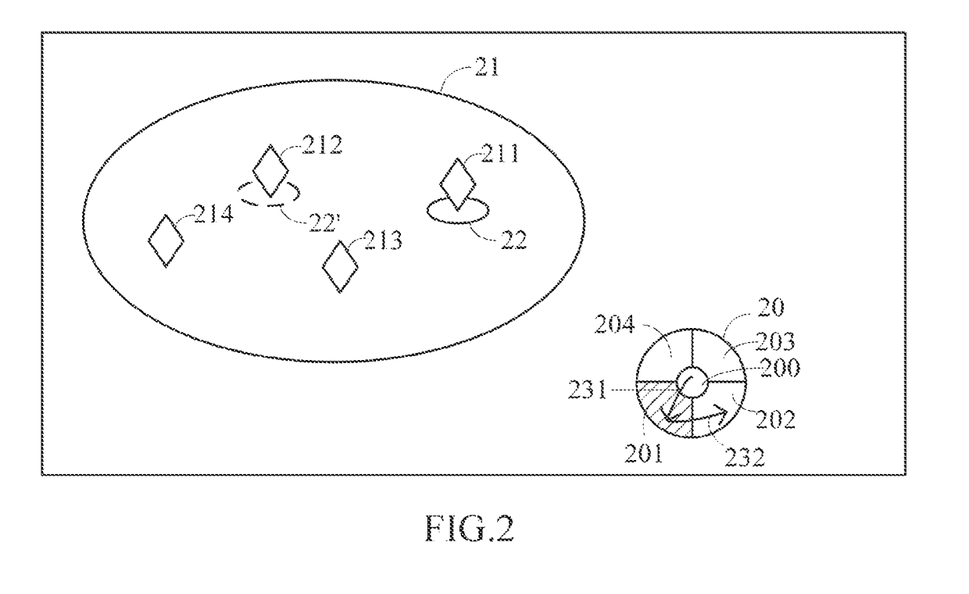
FIG. 2 shows a schematic diagram of a graphical user interface according to an embodiment of the present disclosure

Specifically, in an alternative embodiment, FIG. 2 shows a schematic diagram of a graphical user interface. Referring to FIG. 2, in the step S101, when the general attack button is triggered by the first touch operation, the attack target corresponding to the first attack operation is all enemy game characters or the enemy game character determined within an attack range according to the preset automatic target selection rule, the first game character is controlled to perform the first attack operation corresponding to the first attack control, or all enemy game characters in the range 21 are attacked. In the step S102, when the general attack button is triggered by the second touch operation, the target selection control 20 is displayed, and the target selection control 20 contains at least one game character identification (e.g., a game character identification 201, a game character identification 202, a game character identification 203, a game character identification 204). Further, the target game character identification is determined from the at least one game character identification according to the third touch operation acting on the target selection control 20, thereby controlling the first game character to perform the first attack operation against the target game character corresponding to the target game character identification.

Exemplarily, the game character identification 203 in FIG. 2 has a corresponding relationship with the second game character 213 in the attack range 21 of the first attack operation. After the player selects the game character identification 203 by the target selection control 20, the game character identification 203 is taken as the target game character identification, and the second game character 213 is taken as the target game character, so that the first game character is controlled to perform the first attack operation against the second game character 213 corresponding to the game character identification 203.

In an exemplary embodiment, a display position of the target selection control 20 may be determined according to a position of a touch point of the second touch operation. For example, the target selection control 20 is displayed at a position where the end touch point of the second touch operation is located. If the target selection control 20 is a circle, the end touch point of the second touch operation can be used as the center of the circle.

In an exemplary embodiment, the display position of the target selection control 20 may also be determined according to the position of the first attack control. For example, in response to the second touch operation acting on the first attack control, the target selection control 20 is displayed at a preset distance from the first attack control, where the preset distance has an upper limit value, or, in a preferable embodiment, the target selection control may be displayed at the position of the first attack control. In this way, the target selection control can be made to display the arrangement difference of the attack control, thereby reducing the occlusion of the game picture by the target selection control, and avoiding the display position of the target selection control 20 being far away from the first attack control to cause the player finger to move a long distance, thus, speeding up the selection of the attack target, which facilitates the target selection by the target selection control arranged in a circular form after the second touch operation, making the operation more coherent and avoiding missing attack opportunities in the game battle.

In an exemplary embodiment, the game character identification in the target selection control 20 is a game character identification corresponding to the second game character that satisfies the preset condition. That is, the second game character is determined according to the preset condition, so that the second game character is displayed in the target selection control 20 for selection by the player, and the selected second game character is taken as the attack target. In this embodiment, the identification of the enemy game character that satisfies the preset condition is displayed in the target selection control for selection by the player, rather than all enemy game characters, thereby reducing the number of identifications in the target selection control under the premise of ensuring the accuracy of attack target selection, so that the occupation of the limited display area of the mobile terminal's screen is reduced, and it avoids the occlusion of the game scene by a lame number of game character images, thereby further improving the user's game experience.

Exemplarily, the preset condition may be related to the position of the first game character. Therefore, the second game character satisfying the preset condition is: a game character within a circular range with a preset radius value and the position of the first game character as the center of the circle. It can be understood that the circular range may move according to the movement of the first game character. That is to say, when the distance between the enemy game character and the first game character is less than the preset radius value, the game character identification corresponding to the enemy game character can be displayed in the target selection control 20, and the player can select the enemy game character in the target selection control 20 as the target game character, which is taken as the attack target to perform the first attack operation by the player. As a result, the player can prefer to choose the enemy game character which is closer to her/him (with higher threat) as the attack target, and attack the enemy game character accurately and quickly, thereby making the game operation more flexible and efficient, which is conducive to improving the player's game experience.

Exemplarily, the preset condition may also be related to the attribute of the first attack operation, and the attack range corresponding to the first attack operation is determined according to the attribute of the first attack operation. Therefore, the second game character satisfying the preset condition is: a game character within the attack range corresponding to the first attack operation. That is to say, when the enemy game character is within the attack range corresponding to the first attack operation, the game character identification corresponding to the enemy game character can be displayed in the target selection control 20. The player can select the enemy game character in the target selection control 20 as the target game character, which is taken as the attack target to perform the first attack operation by the player. By targeting the enemy game character within the attack range, it is helpful to improve the attack success rate, making the game operation more flexible and efficient, and improving the player's game experience.

In an exemplary embodiment, the positions occupied by the plurality of game character identifications in the target selection control 20 may be determined according to the different attributes of the second game character, for example, the game character's type, blood volume, or the like. For example, the plurality of game character identifications in the target selection control 20 is arranged in a descending order of blood volume values. For another example, the order of the types of game characters is preset, and the plurality of game character identifications in the target selection control 20 are displayed according to the preset type attributes. Therefore, the convenience of selecting the attack target when the player is attacking is improved, which is beneficial to improving the player's game experience.

In an exemplary embodiment, the sizes of the operation response areas occupied by the plurality of game character identifications in the target selection control 20 are determined according to the different attributes of the second game character, for example, the game character's type, blood volume, or the like. The operation response area of the game character identification may be equal to the display area of the game character identification, or may be larger than the display area of the game character. For example, for a game character with a small blood volume or a preset specific type, the corresponding operation response area in the target selection control is large, so that the player can more easily select the character, so as to further improve the convenience of selecting the attack target when the player is attacking.

In an exemplary embodiment, the first touch operation is a touch tapping operation. For example, the enemy game character or all enemy game characters within the attack range 21 are attacked by tapping the general attack button. Alternatively, the first game character is controlled to perform the first attack operation corresponding to the first attack control according to preset automatic target selection rule. The second touch operation is a touch sliding operation, for example, the display of the target selection control 20 is triggered by sliding the general attack button.

In an exemplary embodiment, there may be also other implementations of the first touch mode and the second touch mode, for example, press slightly and press heavily, or tap and long-press, respectively. It should be noted that since both the first touch mode and the second touch mode are acted on the first trigger control, as long as the first touch mode is different from the second touch mode, the first attack operation corresponds to different attack targets by implementing different touch operations on the same trigger space, which achieves the technical effect of providing the game player with multiple attack manners, makes the game operations more flexible, and thus improves the player's game experience.

In an exemplary embodiment, after the display of the target selection control 20 is achieved by the second touch operation, the target game character identification is selected in the target selection control by the third touch operation. The third touch operation is a touch sliding operation that is continuous with the second touch operation. Selecting the target game character identification in the target selection control by continuous touch sliding operations is beneficial to reducing the player's finger actions, such as: lifting off the screen, touching he screen again, or the like. Therefore, the player can complete the selection of the target attack object by continuous finger actions, which is beneficial to improving the selection accuracy and speediness.

Compared with the operation manners for the attack targets in the related art, in the technical solutions provided by the optional embodiments of the present disclosure, the display position of the target selection control is determined according to the position of the first attack control, or, the display position of the target selection control is determined according to the position of the touch point of the second touch operation, so that the target selection control can be displayed in the arrangement area of the attack control, for example, in some games, multiple skill attack controls and a general attack control are arranged in the lower right corner of the screen, which is beneficial to reducing the occupation of the limited screen display area of the mobile terminal and avoids the large game character image from blocking the game scene, thereby helping to further improve the user's game experience. In an alternative embodiment, the game character identifications in the target selection controls are arranged in a circular form, which can facilitate target selection by the target selection control arranged in a circular form after the second touch operation, and make the operations more consistent to avoid missing attack opportunities in the battle.

In an exemplary embodiment, referring to FIG. 2, after the second touch operation acts on the first trigger control, the target selection control 20 containing at least one game character identification (e.g., an image identification, a text identification, etc.) is displayed. In this example, in order to facilitate the player's finger movement, the end touch point 200 of the second touch operation is used as the display center of the target selection control 20, and the rotary-type target selection control 20 is displayed. That is, the game character identifications corresponding to the second game characters in the target selection control 20 are arranged in a circular form, and the game character identifications corresponding to each second game character are arranged in a fan-shaped (for example, the game character identification 201 to the game character identification 204 corresponds to 4 second game characters). In an exemplary embodiment, the specific implementation of determining the target game character identification according to the third touch operation in the step S102 may be: determining the target game character identification from the at least one game character identification at least according to a position of a touch point of the third touch operation acting on the target selection control 20.

Exemplarily, during a preset duration from the display of the target selection control 20, for example, 0.5 seconds, the touch point of the third touch operation of the player's finger is located at the game character identification 201, indicating that the attack target selected by the player is the second game character 211 that has a mapping relationship with the game character identification 201. That is, the target game character identification is the game identification corresponding to the second game character 211. Exemplarily, the selection indicator 22 is displayed at the selected second game character 211 to inform the player that the virtual element 211 has been selected. Alternatively, a reminder of selecting the attack target is pushed to remind the player of having successfully selected the attack target.

Exemplarily, during a preset duration from the display of the target selection control 20, for example, 0.5 seconds, the touch point of the third touch operation of the player's finger is located at the game character identification 204 and the duration of the player's finger touching the game character identification 204 is longer than another preset duration (for example, 0.2 seconds), indicating that the attack target selected by the player is the second game character 214 that has a mapping relationship with the game character identification 204. That is, the target game character identification is the game identification corresponding to the second game character 214.

Exemplarily, during a preset duration from the display of the target selection control 20, for example, 0.5 seconds, the touch point of the third touch operation of the player's finger is located at the game character identification 202 and the pressure generated by the player's finger touching the game character identification 202 is greater than a preset pressure value (e.g., 100 Pa), indicating that the attack target selected by the player is the second game character 212 that has a mapping relationship with the game character identification 202. That is, the target game character identification is the game identification corresponding to the second game character 212.

Figure 3:
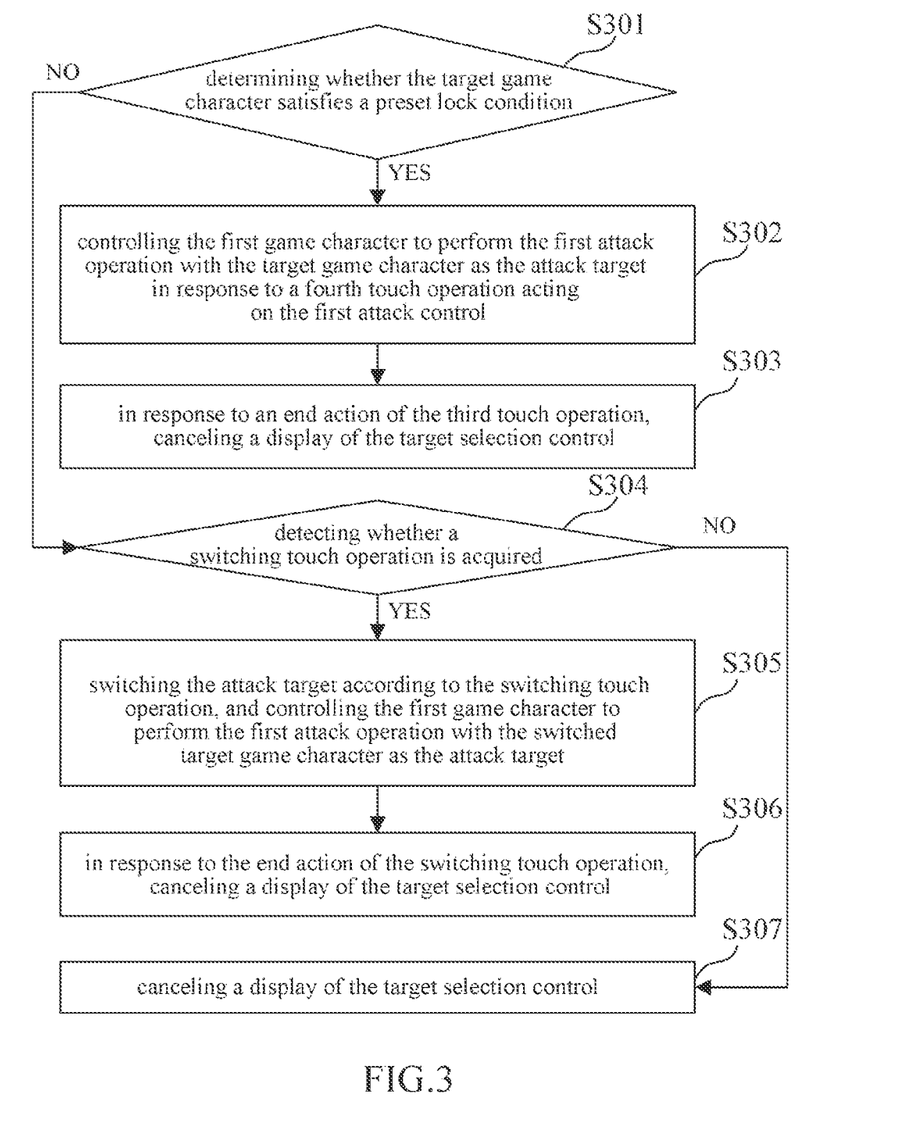
FIG. 3 shows a schematic flowchart of an information processing method in a mobile terminal according to another embodiment of the present disclosure.

The above different ways of determining the target game character identification are helpful to improve the accuracy of attacking the targets, can avoid invalid attacks caused by the player's misoperation, and thus help to improve the player's game experience.

in an exemplary embodiment, FIG. 3 shows a schematic flowchart of an information processing method in a mobile terminal according to another embodiment of the present disclosure. The method shown in the figure is executed after the step S102. Referring to FIG. 3, the method includes steps S301 to S307.

In the step S301, it is determined whether the target game character satisfies a preset locking condition.

In an exemplary embodiment, the preset locking condition includes: a vitality index corresponding to the target game character is greater than zero and no switching touch operation is detected.

If the determination result of the step S301 is that the target game character satisfies the preset locking condition, then the steps S302 and S303 are executed.

In the step S302, in response to a fourth touch operation acting on the first attack control, the first game character is controlled to perform the first attack operation with the target game character as the attack target. That is, in a state where the current target game character is not dead, and the player does not switch the attack target, the first game character is controlled to perform the first attack operation with the current target game character as the attack target.

In the step S303, in response to the third touch operation being finished, the display of the target selection control is canceled. Exemplarily, the third touch operation is a touch sliding operation that is continuous with the second touch operation, and the finishing of the third touch operation may be an action of the player's finger leaving the mobile phones screen during the third touch operation. Exemplarily, after the touch sliding operation (the third touch operation) that is continuous with the second touch operation is slid to the target character identification, and the third touch operation further includes a long-press operation, the finishing of the third touch operation may also be set as: the players finger presses on the screen for a preset press duration by the long-press operation of the third touch operation, and the finishing of the third touch operation is at the end of the preset press duration. For example, after the touch sliding operation (the third touch operation) that is continuous with the second touch operation is slid to the target character identification, and the player's linger presses on the screen by the long-press operation of the third touch operation, when the press duration reaches the preset press duration, for example, 2 seconds, the display of the target selection control is cancelled.

If the determination result in the step S301 is that the target game character does not satisfy the preset locking condition, then steps S304 to S307 are executed.

In the step S304, it is detected whether a switching touch operation is acquired.

In an exemplary embodiment, the switching touch operation may be: the switching touch operation may be a touch sliding operation continuous with the third touch operation. Referring to FIG. 2, when the player has successfully selected the game character identification 201 (the first target game character identification) in the target selection control 20 by the third touch operation 231, at this time, the selection indicator 22 is displayed at the target game character 211 corresponding to the game character identification 201. Further, the player performs the touch sliding operation 232 that is continuous with the third touch operation 231, for example, the touch operation taking the end point of the third touch operation 231 as the starting point of the touch sliding operation 232, the game character identification 202 in the target selection control 20 corresponding to the end point of the touch sliding operation 232 is obtained as the second target game character identification. The target game character is switched from 211 to 212, thereby completing the switching of the target game character. At this time, the selection indicator 22' is displayed at the target game character 212 corresponding to the game character identification 202.

Further, if the determination result in the step S304 is: the detection result is that the switching touch operation has been acquired, steps S305 and S306 are executed. If the determination result in the step S304 is: the detection result is that the switching touch operation has not been obtained, step S307 is executed.

In the step S305, the attack target is switched according to the switching touch operation, and the first game character is controlled to perform the first attack operation against the target game character. That is to say, when the player switches the attack target, the current target game character is no longer locked as the attack target, but the target is renewed to be the switched target game character.

In the step S306, in response to the switching touch operation being finished, the display of the target selection control is canceled. Exemplarily, the switching touch operation may be a touch sliding operation that is continuous with the third touch operation, and the finishing of the switching touch operation may be an action of the player's finger leaving the mobile phone's screen during the switching touch operation. Exemplarily, after the touch sliding operation (that is, the switching touch operation) that is continuous with the third touch operation slides to the next target character identification, and the switching touch operation further includes the long-press operation, the finishing of the switching touch operation may also be set as: the player's finger presses on the screen for a preset press duration by the long-press operation of the switching touch operation, and the finishing of the switching touch operation is at the end of the preset press duration. For example, after the touch sliding operation (that is, the switching touch operation) that is continuous with the third touch operation slides to the next target character identification, and the player's finger presses on the screen by the long-press operation of the switching touch operation, when the press duration reaches the preset press duration (e.g., 2.5 seconds), the display of the target selection control is cancelled.

In the step S307, the display of the target selection control is cancelled. That is to say, when the attack target is no longer locked as the current target game character, and the switching touch operation is not detected, the display of the target selection control is directly cancelled to minimize the occlusion of the graphical user interface by the target selection space.

Figure 4:
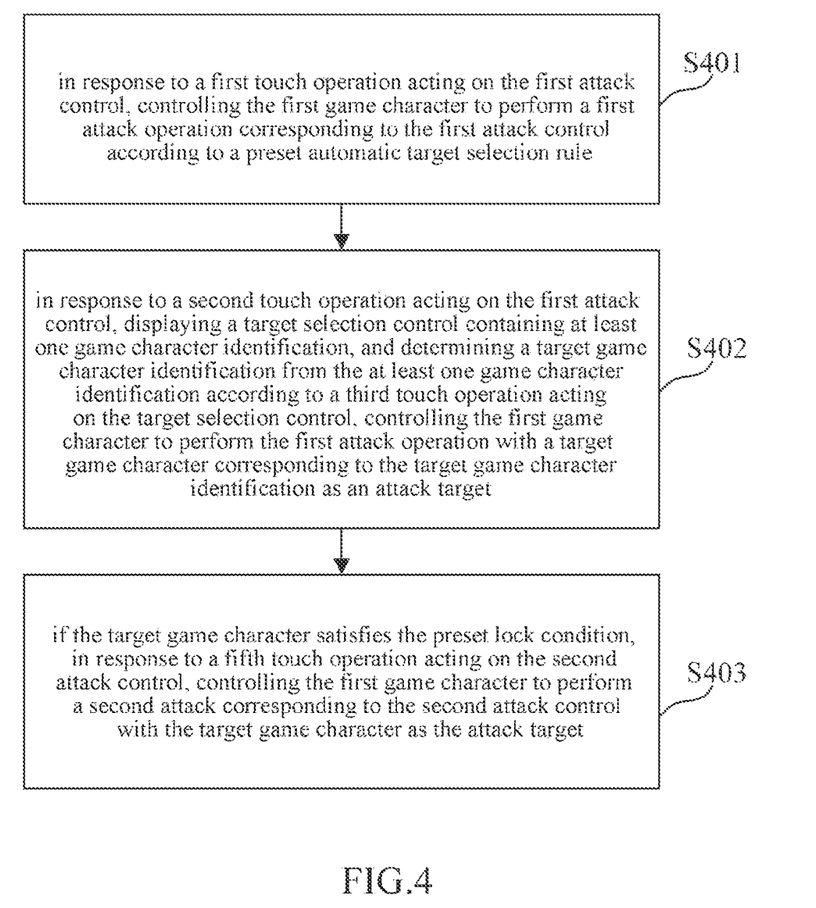
FIG. 4 shows a schematic flowchart of an information processing method in a mobile terminal according to yet another embodiment of the present disclosure.

FIG. 4 shows a schematic flowchart of an information processing method in a mobile terminal according to yet another embodiment of the present disclosure. This embodiment is carried out on the basis of the above embodiments. Specifically, in this embodiment, a software application of a preset game is run in the mobile terminal and a graphical user interface is rendered on a display of the mobile terminal. In addition to the first game character and the first attack control, the graphical user interface also contains: a second attack control.

Referring to FIG. 4, the information processing method in the mobile terminal provided by this embodiment includes steps S401-S403.

In the exemplary embodiment, the specific implementation of the step S401 is the same as the specific implementation of the step S101, and the specific implementation of step S402 is the same as the specific implementation of the step S102, and details are not described herein.

In the step S403, if the target game character satisfies the preset locking condition, in response to a fifth touch operation acting on the second attack control, the first game character is controlled to perform the second attack operation corresponding to the second attack control against the target game character. The fifth touch operation is chronologically later than the third touch operation.

In the exemplary embodiment, the specific implementation of determining whether the target game character satisfies the preset locking condition is the same as the specific implementation manner of the step S301.

In an exemplary embodiment, in a case where the target game character satisfies the preset locking condition, the player may have the fifth touch operation (e.g., click, double-click, long-press, etc.) acted on the second attack control of the graphical user interface, and the first game character is controlled to perform the second attack operation corresponding to the second attack control against the target game character. That is to say, after the player selects one target game character, he can perform multiple attack operations on the target game character in sequence.

Exemplarily, the attack operation corresponding to the first attack control is a sniper rifle attack, and the attack operation corresponding to the second attack control is a rifle attack. According to the real-time changes of the game scene, the player first attacks the target game character by the sniper rifle corresponding to the first attack control, and then can attack the target game character by the rifle corresponding to the second attack control when the target game character is locked.

In an exemplary embodiment, whether it is to perform the second attack operation corresponding to the second attack control in the step S102), or to perform the second attack operation corresponding to the second attack control (e.g., in step S403), the preset distance from the attack target is the automatic adsorption range of the attack operation. That is to say, after the skill indicator corresponding to the attack operation reaches the automatic adsorption range, the skill indicator corresponding to the attack operation will be automatically adsorbed to the attack target to perform the attack operation on the attack target. Therefore, it can help the player to release the skills more accurately, and can also assist the player to release the skills in a more concealed manner, thereby improving the experience of releasing the skills to a certain extent. In addition, it can reduce operational errors that occur during the release of skills and improve the player's game experience.

In an exemplary embodiment, when the player selects the attack target with a sliding touch mode, there is a relative mapping relationship between the movement route of the skill indicator corresponding to the attack operation to the attack target and the sliding route of the player's finger. Specifically, the sliding distance of the player's finger *k=the moving distance of the skill indicator, where k is the relative mapping coefficient in this operation. Therefore, the jump problem after the smart casting lock of the skill indicator is released has been solved, thereby improving the player's experience during the game. In addition, the absolute mapping relationship between the skill indicator and the player's finger sliding is changed to the relative mapping relationship, which eliminates problems such as operational errors caused by the inconsistency between the original manner and the psychological cognitive model.

The following describes apparatus embodiments of the present disclosure, which can be configured to execute the information processing method in the mobile terminal described above.

Figure 5:
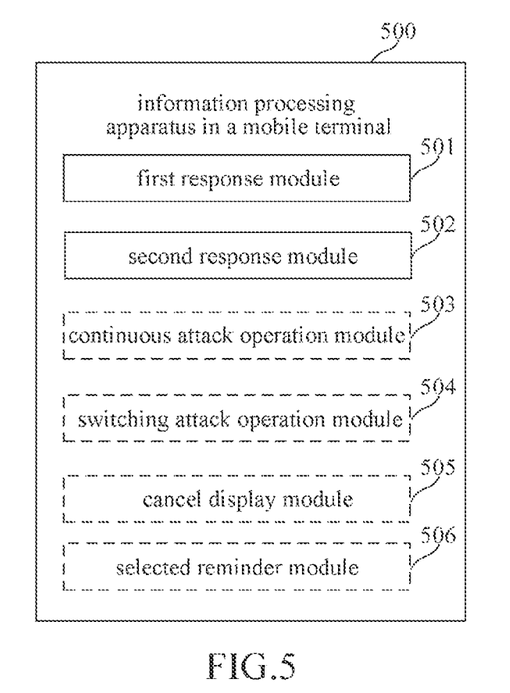
FIG. 5 shows a schematic structural diagram of an information processing apparatus in a mobile terminal according to an embodiment of the present disclosure; and, FIG. 6 shows a schematic structural diagram of a computer system suitable for implementing an electronic device according to an embodiment of the present disclosure.

FIG. 5 shows a schematic structural diagram of an information processing apparatus in a mobile terminal according to an embodiment of the present disclosure. A software application of a preset game is run in the mobile terminal and a graphical user interface is rendered on a display of the mobile terminal, the graphical user interface contains a first game character and a first attack control.

Referring to FIG. 5, the above information processing apparatus 500 in the mobile terminal includes a first response module 501 and a second response module 502.

The above first response module 501 is configured to:

in response to a first touch operation acting on the first attack control, control the first game character to perform a first attack operation corresponding to the first attack control according to a preset automatic target selection rule.

The second response module 502 is configured to:

in response to a second touch operation acting on the first attack control, display a target selection control containing at least one game character identification, determine a target game character identification from the at least one game character identification according to a third touch operation acting on the target selection control, and in response to the third touch operation acting on the target selection control, control the first game character to perform the first attack operation against a target game character corresponding to the target game character identification.

In some embodiments of the present disclosure, based on the foregoing embodiments, the at least one game character identification in the target selection control is a game character identification corresponding to a second game character that satisfies a preset condition.

In some embodiments of the present disclosure, based on the foregoing embodiments, the second game character that satisfies the preset condition includes: a second game character determined according to a position of the first game character.

In some embodiments of the present disclosure, based on the foregoing embodiments, the second game character that satisfies the preset condition includes: a second game character determined according to an attribute of the first attack operation.

In some embodiments of the present disclosure, based on the foregoing embodiments, the first touch operation is a touch tapping operation, the second touch operation is a touch sliding operation, and the third touch operation is a touch sliding operation that is continuous with the second touch operation.

In some embodiments of the present disclosure, based on the foregoing embodiments, the first response module 502 is specifically configured to:

determine the target game character identification from the at least one game character identification at least according to a position of a touch point of the third touch operation acting on the target selection control.

In some embodiments of the present disclosure, based on the foregoing embodiments, the information processing apparatus 500 in the mobile terminal further includes: a continuous attack operation module 503.

The continuous attack operation module 503 is configured to: if the target game character satisfies a preset locking condition, control the first game character to perform the first attack operation against the target game character in response to a fourth touch operation acting on the first attack control, wherein the fourth touch operation is chronologically later than the third touch operation.

in some embodiments of the present disclosure, based on the foregoing embodiments, the game character identifications in the target selection control are arranged in a circular form.

In some embodiments of the present disclosure, based on the foregoing embodiments, a position of a corresponding game character identification in the target selection control is determined according to an attribute of the second game character.

In some embodiments of the present disclosure, based on the foregoing embodiments, a size of an operation response area of the corresponding game character identification in the target selection control is determined according to the attribute of the second game character.

In some embodiments of the present disclosure, based on the foregoing embodiments, a display position of the target selection control is determined according to a position of the first attack control.

In some embodiments of the present disclosure, based on the foregoing embodiments, the display position of the target selection control is determined according to a position of a touch point of the second touch operation.

In some embodiments of the present disclosure, based on the foregoing embodiment, a second attack control is contained in the graphical user interface, and the information processing apparatus 500 in the mobile terminal further includes: a switching attack operation module 504.

The switching attack operation module 504 is configured to: if the target game character satisfies the preset locking condition, in response to a fifth touch operation acting on the second attack control, control the first game character to perform a second attack operation corresponding to the second attack control against the target game character, and the fifth touch operation is chronologically later than the third touch operation.

In some embodiments of the present disclosure, based on the foregoing embodiments, the preset locking condition includes: a vitality index corresponding to the target game character is greater than zero and no switching touch operation is detected.

In some embodiments of the present disclosure, based on the foregoing embodiments, the information processing apparatus 500 in the mobile terminal further includes: a cancel display module 505.

The cancel display module 505 is configured to: in response to the third touch operation being finished, cancel display of the target selection control.

In some embodiments of the present disclosure, based on the foregoing embodiments, the information processing apparatus 500 in the mobile terminal further includes: a selected reminder module 506.

The selected reminder module 506 is configured to display a selected identification at the attack target, and/or, after determining the target game character identification, push a reminder of selecting the attack target to remind a player of having successfully selected the attack target.

Since each functional module of the information processing apparatus in the mobile terminal of the exemplary embodiment of the present disclosure corresponds to the steps of the above exemplary embodiment of the information processing method in the mobile terminal, as for details not disclosed in the apparatus embodiment of the present disclosure, please refer to the embodiment of the information processing method in the mobile terminal described above in the present disclosure.

Figure 6:
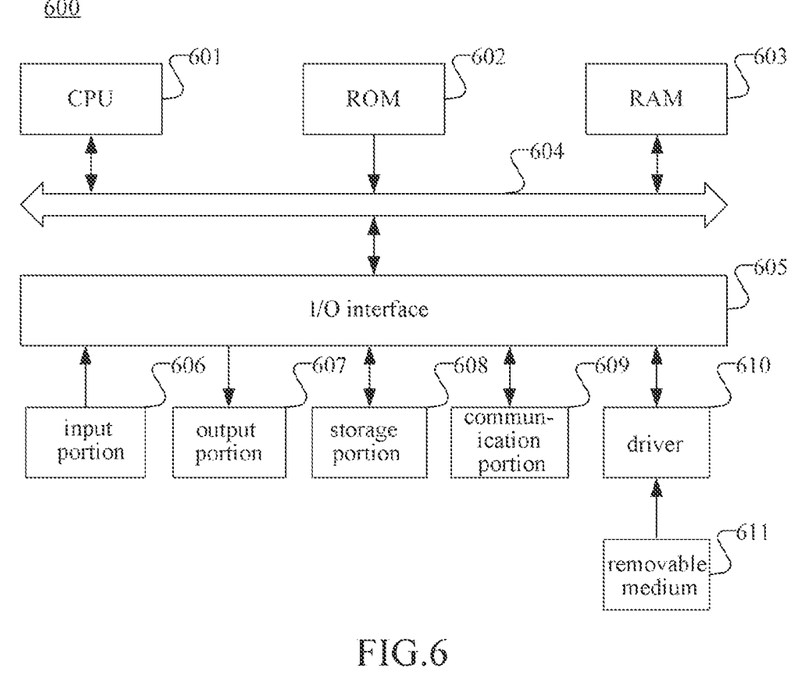

Reference is made to FIG. 6 below, which shows a schematic structural diagram of a computer system 600 suitable for implementing an electronic device of an embodiment of the present disclosure. The computer system 600 of the electronic device shown in FIG. 6 is just an example, and should not bring any limitation to the functions and usage scope of the embodiments of the present disclosure.

As shown in FIG. 6, the computer system 600 includes a central processing unit (CPU) 601, which can perform various appropriate actions and processes based on a program stored in a read-only memory (ROM) 602 or a program loaded from the storage portion 608 into a random access memory (RAM) 603. In RAM 603, various programs and data necessary for the operations of the system are also stored. The CPU 601, ROM 602 and RAM 603 are connected to each other through the bus 604. The input/output (I/O) interface 605 is also connected to the bus 604.

The following components are connected to the I/O interface 605: an input portion 606 including a keyboard, a mouse, etc.; an output portion 607 including such as a cathode ray tube (CRT), a quid crystal display (LCD) and a speaker; a storage portion 608 including a hard disk, etc.; and a communication portion 609 including a network interface card such as a LAN card, a modem, or the like. The communication portion 609 performs communication processing via a network such as the Internet. The driver 610 is also connected to the I/O interface 605 as needed. The removable medium 611, such as magnetic disks, optical disks, magneto-optical disks, semiconductor memories, etc., are installed on the driver 610 as needed, so that the computer program read out therefrom is installed into the storage portion 608 as needed.

In particular, according to the embodiments of the present disclosure, the process described above with reference to the flowchart can be implemented as a computer software program. For example, the embodiments of the present disclosure include a computer program product that includes a computer program carried in the computer-readable medium. The computer program contains program codes for executing the method shown in the flowchart. In such an embodiment, the computer program may be downloaded from the network through the communication portion 609 and installed, and/or installed from the removable medium 611. When the computer program is executed by the central processing unit (CPU) 601, the above-mentioned functions defined in the system of the present application are executed.

It should be noted that the computer-readable medium shown in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of computer-readable storage media may include, but not limited to: electrical connections with one or more wires, portable computer disks, hard disks, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal can take many forms, including but not limited to: electromagnetic signals, optical signals, or any suitable combination of the foregoing. The computer-readable signal medium may also be any computer-readable medium other than the computer-readable storage medium. The computer-readable medium may send, propagate or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the drawings illustrate possible implementations of architecture, functions and operations of the system, method and computer program product according to various embodiments of the present disclosure. In this regard, each block in the flowchart or block diagram may represent a module, a program segment, or a portion of codes, and the above-mentioned module, program segment, or the portion of codes contains one or more executable instructions for implementing specified logical functions. It should also be noted that, in some alternative implementations, the functions noted in the blocks may occur in an order different from that noted in the drawings. For example, two consecutive blocks can actually be executed in parallel, and sometimes they can also be executed in a reverse order, depending on the functions involved. It should also be noted that each block in the block diagram or flowchart, and a combination of blocks in the block diagram or flowchart, can be implemented with a dedicated hardware-based system that performs the specified function or operation, or with a combination of a dedicated hardware and computer instructions.

The units involved in the embodiments described in the present disclosure can be implemented in software or hardware. The described unit can also be provided in the processor. The names of these units do not constitute a limitation on the unit itself under certain circumstances.

As another aspect, the present application also provides a computer-readable medium. The computer-readable medium may be included in the electronic device described in the above embodiments; or it may exist alone without being assembled into the electronic device. The of computer-readable medium carries one or more programs, and when the aforementioned one or more programs are executed by the electronic device, the electronic device realizes the information processing method in the mobile terminal as described in the aforementioned embodiment.

For example, the electronic device may implement what shown in FIG. 1: in the step S101, in response to a first touch operation acting on the first attack control, the first game character is controlled to perform a first attack operation corresponding to the first attack control according to a preset automatic target selection rule; in the step S102, in response to a second touch operation acting on the first attack control, a target selection control containing at least one game character identification is displayed, and a target game character identification is determined from the at least one game character identification according to a third touch operation acting on the target selection control, and in response to the third touch operation acting on the target selection control, the first game character is controlled to perform the first attack operation against a target game character corresponding to the target game character identification.

As another example, the electronic device can implement the steps shown in FIG. 3 or FIG. 4.

It should be noticed that, although several modules or units of devices for action execution are mentioned in the detailed description above, such division is not mandatory. Indeed, according to embodiments of the present disclosure, the features and functions of two or more modules or units described above may be embodied in one module or unit. Conversely, the features and functions of one of the modules or units described above may be further divided into a plurality of modules or units to embody.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB flash drive, a mobile hard disk, etc.) or on a network, including a number of instructions to make a computing device (which may be a personal computer, a server, a touch terminal, or a network device, etc.) to perform the methods according to embodiments in the present disclosure.

Other embodiments of the present disclosure will be apparent to those skilled in the art after consideration of the specification and practice of the present disclosure disclosed here. The present application is intended to cover any variations, uses, or adaptive changes of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

It should be understood that this disclosure is not limited to the exact structure described above and shown in the accompanying drawings, and may be subject to various modifications and changes without deviating from its scope. The scope of the disclosure is to be limited only by the appended claims.

What is claimed is:

1. An information processing method in a mobile terminal, wherein a software application of a preset game is run in the mobile terminal, a graphical user interface is rendered on a display of the mobile terminal, and the graphical user interface contains a first game character and a first attack control, the method comprising:
   in response to a first touch operation acting on the first attack control, controlling the first game character to perform a first attack operation corresponding to the first attack control according to a preset automatic target selection rule;
   in response to a second touch operation acting on the first attack control, displaying a target selection control containing at least one game character identification, wherein the second touch operation is different from the first touch operation;
   determining a game character identification from the at least one game character identification as a target game character identification according to a third touch operation acting on the target selection control; and
   in response to the third touch operation acting on the target selection control, controlling the first game character to perform the first attack operation against a target game character corresponding to the target game character identification,
   wherein the at least one game character identification in the target selection control is a game character identification corresponding to a second game character that satisfies a preset condition, wherein the second game character that satisfies the preset condition comprises: a second game character determined according to a position of the first game character, wherein a size of an operation response area of a corresponding game character identification in the target selection control is dynamically adjusted according to an attribute of the second game character.

2. The method according to claim 1, wherein the second game character that satisfies the preset condition comprises: a second game character determined according to an attribute of the first attack operation.

3. The method according to claim 1, wherein the first touch operation is a touch tapping operation, the second touch operation is a touch sliding operation, and the third touch operation is a touch sliding operation that is continuous with the second touch operation.

4. The method according to claim 3, wherein determining the game character identification from the at least one game character identification as the target game character identification according to the third touch operation acting on the target selection control comprises:
   determining the target game character identification from the at least one game character identification at least according to a position of a touch point of the third touch operation acting on the target selection control.

5. The method according to claim 1, wherein the method further comprises:
   in response to determining the target game character satisfies a preset locking condition, controlling the first game character to perform the first attack operation against the target game character in response to a fourth touch operation acting on the first attack control, wherein the fourth touch operation is chronologically later than the third touch operation.

6. The method according to claim 5, wherein the preset locking condition comprises: a vitality index corresponding to the target game character is greater than zero and no switching touch operation is detected.

7. The method according to claim 1, wherein the game character identifications in the target selection control are arranged in a circular form.

8. The method according to claim 1, wherein a position of a corresponding game character identification in the target selection control is determined according to an attribute of the second game character.

9. The method according to claim 1, wherein a display position of the target selection control is determined according to a position of the first attack control.

10. The method according to claim 1, wherein the display position of the target selection control is determined according to a position of a touch point of the second touch operation.

11. The method according to claim 1, wherein a second attack control is contained in the graphical user interface, the method further comprising:
in response to determining the target game character satisfies the preset locking condition, in response to a fifth touch operation acting on the second attack control, controlling the first game character to perform a second attack operation corresponding to the second attack control against the target game character, wherein the fifth touch operation is chronologically later than the third touch operation.

12. The method according to claim 1, wherein the method further comprises:
in response to the third touch operation being finished, canceling a display of the target selection control.

13. The method according to claim 1, wherein the method further comprises:
displaying a selected identification at the target game character, and/or,
after determining the target game character identification, pushing a reminder of selecting the target game character to remind a player of having successfully selected the target game character.

14. A non-transitory computer-readable medium having a computer program stored thereon, wherein the program, when executed by a processor, causes the processor to perform an information processing method in a mobile terminal, the method comprising:
in response to a first touch operation acting on the first attack control, controlling the first game character to perform a first attack operation corresponding to the first attack control according to a preset automatic target selection rule;
in response to a second touch operation acting on the first attack control, displaying a target selection control containing at least one game character identification, wherein the second touch operation is different from the first touch operation;
determining a game character identification from the at least one game character identification as a target game character identification according to a third touch operation acting on the target selection control; and
in response to the third touch operation acting on the target selection control, controlling the first game character to perform the first attack operation against a target game character corresponding to the target game character identification,
wherein the at least one game character identification in the target selection control is a game character identification corresponding to a second game character that satisfies a preset condition, wherein the second game character that satisfies the preset condition comprises: a second game character determined according to a position of the first game character, wherein a size of an operation response area of a corresponding game character identification in the target selection control is dynamically adjusted according to an attribute of the second game character.

15. The non-transitory computer-readable medium according to claim 14, wherein the at least one game character identification in the target selection control is a game character identification corresponding to a second game character that satisfies a preset condition.

16. The non-transitory computer-readable medium according to claim 14, wherein the second game character that satisfies the preset condition comprises: a second game character determined according to a position of the first game character.

17. An electronic device, comprising:
one or more processors; and
a storage apparatus for storing one or more programs, and the one or more programs, when executed by the one or more processors, cause the one or more processors to perform an information processing method in a mobile terminal, the method comprising:
in response to a first touch operation acting on the first attack control, controlling the first game character to perform a first attack operation corresponding to the first attack control according to a preset automatic target selection rule;
in response to a second touch operation acting on the first attack control, displaying a target selection control containing at least one game character identification, wherein the second touch operation is different from the first touch operation;
determining a game character identification from the at least one game character identification as a target game character identification according to a third touch operation acting on the target selection control; and
in response to the third touch operation acting on the target selection control, controlling the first game character to perform the first attack operation against a target game character corresponding to the target game character identification,
wherein the at least one game character identification in the target selection control is a game character identification corresponding to a second game character that satisfies a preset condition, wherein the second game character that satisfies the preset condition comprises: a second game character determined according to a position of the first game character, wherein a size of an operation response area of a corresponding game character identification in the target selection control is dynamically adjusted according to an attribute of the second game character.

* * * * *